Nov. 17, 1964   J. W. ANDERSON   3,156,940
WINDSHIELD WIPER BLADE
Filed Sept. 10, 1962   2 Sheets-Sheet 1
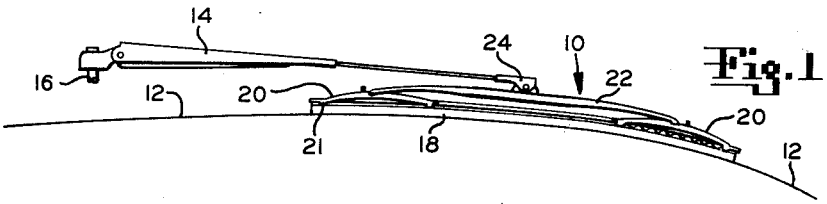
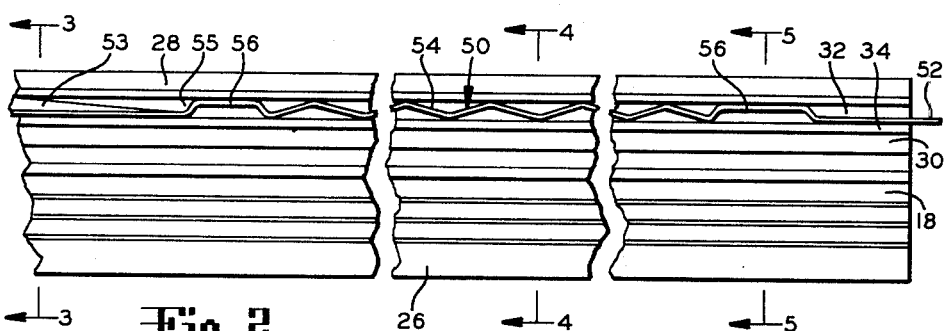
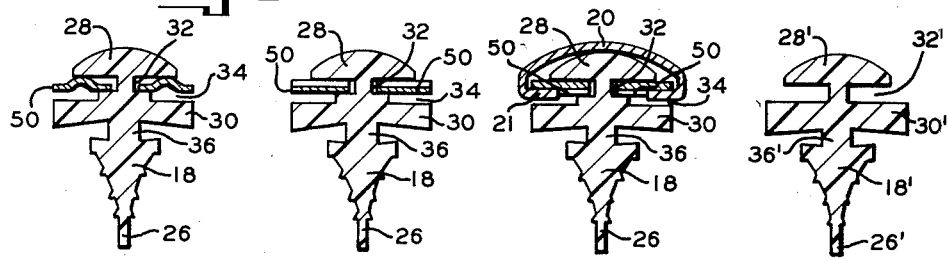
Fig. 6
Fig. 7
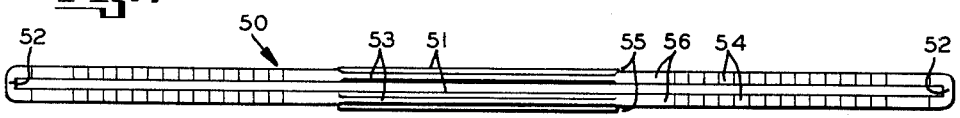
Fig. 8
*INVENTOR.*
JOHN W. ANDERSON
BY
ATTORNEYS Nov. 17, 1964
J. W. ANDERSON
3,156,940
WINDSHIELD WIPER BLADE
Filed Sept. 10, 1962
2 Sheets-Sheet 2
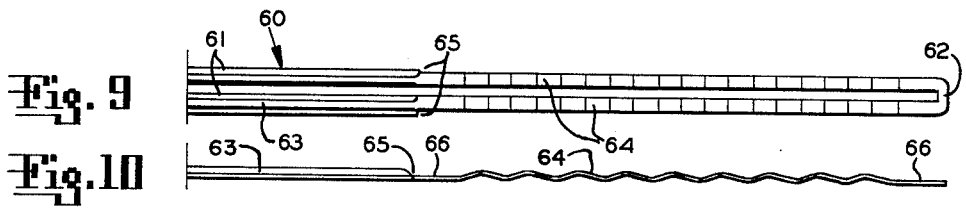
Fig. 9
Fig. 10
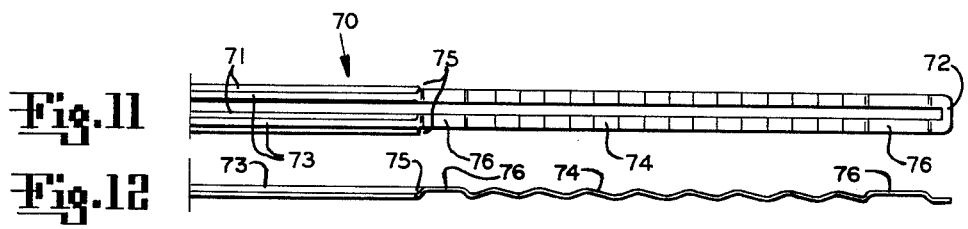
Fig. 11
Fig. 12
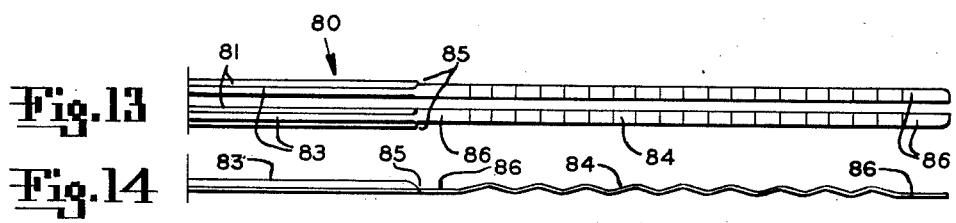
Fig. 13
Fig. 14
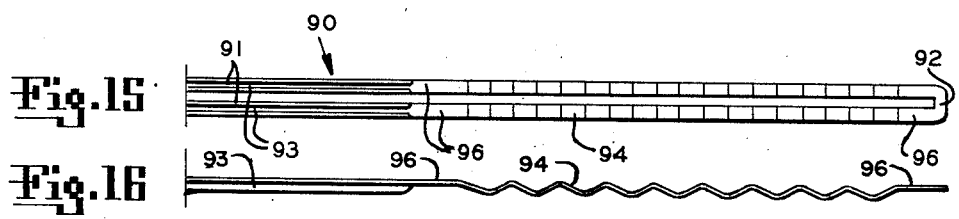
Fig. 15
Fig. 16
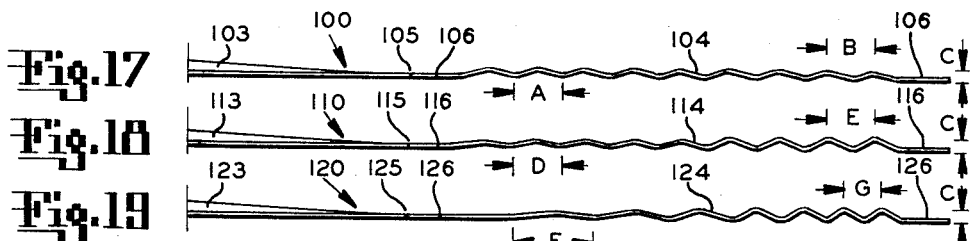
Fig. 17
Fig. 18
Fig. 19
INVENTOR.
JOHN W. ANDERSON
BY
ATTORNEYS

United States Patent Office 3,156,940
Patented Nov. 17, 1964

3,156,940
WINDSHIELD WIPER BLADE
John W. Anderson, 405 S. Huntington St., Gary, Ind.
Filed Sept. 10, 1962, Ser. No. 222,515
2 Claims. (Cl. 15—250.42)

This invention relates to a windshield wiper and is particularly concerned with providing an improved backing member for the squeegee.

This application is a continuation-in-part of my application Serial No. 718,308, filed February 28, 1958, now abandoned, and a continuation-in-part of my application Serial No. 769,404, filed October 24, 1958, now U.S. Patent No. 3,076,993.

An object of this invention is to provide an improved windshield wiper blade which is adapted to be readily urged into wiping contact with curved or irregular surface of a windshield.

Another object of this invention is to provide an improved flexor, backing means or stiffening member for the squeegee for supporting it in a lateral direction but permitting pressure applied at spaced-apart locations along the blade to urge the blade into wiping contact with a curved or irregular surface.

Another object of this invention is to provide an improved flexor which is formed from planar material and provided intermediate its ends with longitudinally extending formations or ridges deformed out of the plane of the planar material for increasing resistance to flexure and wherein transverse formations or corrugations are provided on at least one end for decreasing resistance to flexure.

Another object of this invention is to provide a flexor from relatively thin material adapted to be deformed in vertical directions to substantially fill a receiving groove in the squeegee and contact portions of the groove at spaced-apart locations.

In the drawings:

FIGURE 1 shows a windshield wiper in operative contact with a windshield having a curved or irregular surface;

FIGURE 2 is an enlarged view of one end of the wiper squeegee showing my improved flexor or backing member in position therein;

FIGURE 3 is a cross-sectional view of FIGURE 2 taken substantially along line 3—3;

FIGURE 4 is a cross-sectional view of FIGURE 2 taken substantially along line 4—4;

FIGURE 5 is a cross-sectional view of FIGURE 2 taken substantially along line 5—5 and showing a claw in position therewith;

FIGURE 5a is a cross-sectional view similar to that shown in FIGURE 5 but having flexor-receiving grooves of different configuration;

FIGURE 6 is a plan view of one form of my improved flexor;

FIGURE 7 is a plan view of another form of my flexor;

FIGURE 8 is a plan view of still another form of my flexor;

FIGURE 9 is a view of one end of the flexors of FIGURES 6, 7 and 8;

FIGURE 10 is a side view of the flexor shown in FIGURE 9;

FIGURE 11 discloses a variation of the flexor of FIGURE 9;

FIGURE 12 is a side view of the flexor shown in FIGURE 11;

FIGURE 13 is a plan view of a flexor substantially as shown in FIGURE 9 but consisting of two separate longitudinal side portions;

FIGURE 14 is a side view of the structure shown in FIGURE 13;

FIGURE 15 is a still further representation of one end of my improved flexor;

FIGURE 16 is a side view of the disclosure of FIGURE 15;

FIGURES 17, 18 and 19 represent side views of my flexor disclosing various wave forms for the corrugated end.

It will be apparent, of course, that FIGURES 9 through 19 shown substantially half a flexor; that is, from about the mid-point outwardly toward one end.

A windshield wiper generally designated by the numeral 10 is shown in position on a curved or irregular surface of windshield 12 in FIGURE 1. The wiper 10 is adapted to be oscillated across a surface of a windshield by a spring-urged arm 14 driven by pivot shaft 16. Wiper 10 includes an elongate squeegee member 18 which is operatively received at spaced-apart locations by yokes 20 which in turn are pivotally connected intermediate their ends to opposite ends of a primary yoke or bridge member 22. As can be seen from FIGURE 1, the outer end of arm 14 remote from shaft 16 is attached to bridge member 22 by a connector 24.

As shown in FIGURES 2 through 5, squeegee element 18 is provided with a wiping edge 26 along one extremity thereof; a back portion 28, including laterally projecting ears 30, is provided along another extremity remote from the wiping edge. Back portion 28 includes a pair of generally parallel grooves 32 located on opposite sides thereof. A hinge portion 36 disposed between ears 30 and the wiping edge serves to permit bending of the lower portion of the blade during wiping movement for efficient wiping. It will be noted in FIGURES 3–5 that grooves 32 are additionally provided with a step 34 on an outer edge thereof. Grooves 32 are adapted to receive a flexor or backing member generally designated 50 therein for supporting the squeegee element 10. The member 50 is elongate and formed from planar material to have parallel side portions adapted to straddle a neck or reduced portion of the back portion and be seated in grooves 32 or either side for the purpose of supporting the squeegee in a wiping position. The flexor, located transversely to wiping edge 26, is adapted to be flexed in that direction, but is substantially inflexible in a direction normal to the first direction. The side portions of the flexor are received by claws 21 of secondary yokes 20, as shown in FIGURES 1 and 5.

FIGURE 5a discloses an alternative shape which may be applied to the squeegee. Numeral 26' represents the wiping edge of squeegee 18' which has a back portion 28' including laterally disposed ears 30'. Neck portion 36' provides for hinge action between portions of the squeegee. Grooves 32' vary slightly from that shown in FIGURE 5, for example, because of the elimination of step 34. This type groove may be used as well as those shown in FIGURE 5.

FIGURE 6 shows one form of a flexor generally designated 50 having a pair of spaced-apart parallel side portions 51 connected at their opposite ends by end portions 52. The mid-portion of each side portion 51 is provided with a longitudinally disposed formation or ridge 53 deformed upwardly out of the plane thereof in a manner to increase resistance to flexure of that portion in a direction perpendicular to the longitudinal axis of the flexor or backing means. One extremity of the flexor is provided with transversely disposed formations or corrugations 54 for decreasing the resistance of such extremity to flexure in a direction substantially normal to the longitudinal axis or extent of the flexor; the other extremity of the flexor may be planar as shown. The lateral dimension of each end extremity is reduced thereby defining an intermediate or central portion and shoulders 55.

FIGURE 7 discloses a flexor similar to that disclosed in FIGURE 6. However, it will be noted that upwardly defined ridges or formations 53' extend longitudinally and continuously in the central portion and to the opposite extremity remote from corrugations 54. The ridges may extend throughout the first-mentioned extremity at a constant height or taper from the mid-portion outwardly.

FIGURE 8 discloses a flexor provided with longitudinal formations or ridges 53 at the mid-portion thereof like the ridges in FIGURE 6, and each opposite end or extremity is provided with transverse corrugations 54.

As will be noted in the form disclosed in FIGURES 9 and 10, longitudinally extending formations, preferably in the form of ridges 63, are provided in spaced-apart parallel side portions 61 of the flexor 60 to increase the resistance to flexure at the central portion of the flexor. Transverse formations or corrugations 64 are provided adjacent one extremity of the flexor. The ends of sides 61 are connected by end portions 62. Longitudinally spaced portions 66 provide seats to receive the claws 21 of secondary yokes 20, as mentioned above. Shoulders 65 defined by the variation in the width of the flexor are adapted to cooperate with the inner claws of the yokes to prevent linear separation of the flexor therefrom.

FIGURES 11 and 12 disclose a flexor 70 having generally parallel side portions 71 which are connected by end portions 72 at opposite ends thereof. Side portions 71 each contain upwardly deformed longitudinally extending formations or ridges 73 whereas an outer portion or extremity is provided with transverse formations preferably in the form of corrugations 74. Longitudinally spaced seats 76 are provided in the outer extremity for receiving the claws 21 of secondary yokes 20. Shoulders 75 are provided for engagement by the inner claws of the yokes to prevent longitudinal separation of the flexor therefrom.

FIGURES 13 and 14 disclose a flexor 80 having generally parallel side portions 81 which are not integrally connected. Each side portion 81 is provided with an upwardly deformed longitudinally disposed formation or ridge 83 at the mid-portion thereof, and transverse formations or corrugations 84 on an outer portion. Seats 86 serve to receive claws 21 of the secondary yokes, which claws abut shoulders 85 to prevent longitudinal separation therefrom.

FIGURES 15 and 16 disclose a flexor 90 having generally parallel side portions 91 with downwardly projecting longitudinal formations or ridges 93 at their midportion, and an outer portion provided with transverse formations or corrugations 94. Outer portions 92 connect the ends of side portions 91. Corrugations 94 do not extend above the generally planar surface of the flexor from which the ridges extend, but do extend downwardly a distance not substantially beyond the height of the longitudinal ribs 93. It will be noted that portions 96 of the flexor are not deformed into a recess but remain planar and, in conjunction with adjacent corrugations, define seats for claws 21 of secondary yokes 20. No shoulders are shown on this flexor; however, they may be provided as in the other disclosures.

FIGURES 17, 18 and 19 disclose flexors 100, 110 and 120 having longitudinal formations or ridges 103, 113 and 123, respectively. These ridges may taper, as shown, or be of constant dimension as shown in FIGURE 14, for example. Transverse wave formations or corrugations 104 of FIGURE 17 are substantially constant throughout in wave length and amplitude. In other words, dimension "A" equals dimension "B." In FIGURE 18, the wave length of formations or corrugations 114 is constant; that is, dimension "D" equals dimension "E." However, the amplitude increases toward the outer end thereof to dimension "C" which is preferably no greater than the height of the longitudinal ridges located in the mid-portion of the flexor. FIGURE 19 shows wave formations or corrugations 124 wherein the wave length decreases progressively toward the end of the flexor, while the amplitude increases; that is, dimension "F" is greater than dimension "G." Dimension "C" is preferably constant in all the disclosures and substantially the height of the longitudinal ribbed section. At the extreme end of each flexor, and at a portion intermediate the ridges and the corrugation, planar portions 106, 116 and 126 are respectively provided on the flexors shown in FIGURES 17, 18 and 19 to receive claws 21 of secondary yokes 20.

FIGURES 17, 18 and 19 show linearly disposed shoulders 105, 115 and 125, respectively, for cooperation with inner claws 21 to prevent separation therefrom. These shoulders may be eliminated when other means is provided to eliminate separation from the claws. The midportion, and occasionally one end of the squeegee, generally are not required to traverse a surface of curvature or extreme variance from a plane. In this portion of the flexor, longitudinal ribs 53 spaced inwardly from edges of portions like 51 are provided for increasing resistance to flexure. In this manner, the flexor can be formed from thinner stock to obtain most ideal results and at a substantial reduction in cost. As shown in FIGURES 14 and 16, the longitudinal ribs may be formed out of the plane of the flexor in a direction toward or away from wiping edge 26. Additionally, the longitudinally extending ribs may diminish in height toward their linear extremities to proportionately decrease resistance to flexure outwardly of the mid-point or maximum height.

Inasmuch as it is an object of this invention to provide an improved and less expensive flexor by forming it from thinner material, the longitudinal ridges adjacent the midportion serves to accomplish the same result by providing the essential resilience and characteristics that would be inherent in a flexor of greater thickness. At the midportion, the acquirement of extreme flexibility is not usually required; however, the outer ends of the longitudinal ridges may be tapered, as shown in FIGURES 2, 17, 18 and 19, to provide less resistance to flexure at that location. As shown in all the figures, at least one outer end of the flexor, though originally formed from relatively thin material, is provided with corrugations or undulations for further decreasing its resistance to flexure. The corrugated ends have decreased resistance to flexure by reason of its increased length. This may be further decreased by decrease in thickness when the corrugations are formed. It can be seen that increasing the effective vertical thickness of the flexor substantially increases its supporting characteristics when disposed in grooves 32 of the squeegee 18. While the flexor in planar form is inherently inflexible in a direction lateral of the wiping edge, the longitudinal ridges and the transverse corrugations substantially increase its lateral stability. It is desirable to have the outer end of the squeegee as flexible as possible so that pressure applied thereto by the secondary yokes will readily deform the squeegee into wiping contact with the generally more severely curved or irregular surface.

Having thus described my invention, it is obvious that various modifications may be made in the same without departing from the spirit of the invention; and, therefore, I do not wish to be understood as limiting myself to the exact forms, constructions, arrangements and combinations of parts herein shown and described.

I claim:

1. A flexor for an elongate windshield wiper squeegee, said flexor being elongate and formed from planar material and adapted to permit flexure in a direction generally normal to a planar surface thereof and is relatively inflexible in a direction substantially transverse to the first-mentioned direction, said flexor having generally parallel spaced-apart portions adapted to be received by a squeegee, said flexor having deformations out of the plane of the planar material, said deformations in one area being longitudinally disposed with respect to the longitudinal extent of the flexor for increasing resistance to flexure of said one area while deformations in another area are transversely disposed with respect to the longitudinal extent of the flexor for decreasing resistance to flexure of said another area, a plurality of said transverse deformations defining spaces for freely receiving spaced claw means of a pressure-transmitting superstructure within the confines of upper and lower extremities of said flexor.

2. A windshield wiper comprising an elongate squeegee and a flexor therefor, said squeegee having spaced-apart longitudinally extending parallel grooves on opposite sides therefor, said flexor having spaced-apart generally parallel portions seated in said grooves, said flexor being formed from planar material and being flexible in a plane generally normal thereto and being substantially inflexible in a plane normal to the first-mentioned plane, said flexor having a portion intermediate its ends provided with longitudinally disposed formations normal to the planar surface thereof to increase resistance to flexure, and at least one portion outwardly of the intermediate portion provided with transversely disposed formations normal to the planar surface thereof to decrease resistance to flexure, a plurality of said transverse deformations defining spaces for freely receiving spaced claw means of a pressure-transmitting superstructure within the confines of upper and lower extremities of said flexor.

References Cited in the file of this patent

UNITED STATES PATENTS 2,202,301    Probst _____ May 28, 1940
2,076,993    Anderson _____ Feb. 12, 1963

OTHER REFERENCES

German Application F 17,814 II/63C, Dec. 20, 1956.